United States Patent
Sheu et al.

(10) Patent No.: US 8,694,712 B2
(45) Date of Patent: Apr. 8, 2014

(54) REDUCTION OF OPERATIONAL COSTS OF VIRTUAL TLBS

(75) Inventors: John Te-Jui Sheu, Redmond, WA (US);
Matthew D. Hendel, Seattle, WA (US);
Landy Wang, Redmond, WA (US);
Ernest S. Cohen, Wyncote, PA (US);
Rene Antonio Vega, Kirkland, WA (US);
Sharvil A. Nanavati, Dundas (CA)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 11/634,538

(22) Filed: Dec. 5, 2006

(65) Prior Publication Data
US 2008/0134174 A1 Jun. 5, 2008

(51) Int. Cl.
*G06F 12/00* (2006.01)
*G06F 9/455* (2006.01)

(52) U.S. Cl.
USPC ............. 711/6; 711/207; 711/E12.061; 718/1

(58) Field of Classification Search
USPC ..................... 711/6, E12.061, 207; 718/1
See application file for complete search history.

(56) References Cited

U.S. PATENT DOCUMENTS

| | | | |
|---|---|---|---|
| 5,179,680 A | 1/1993 | Colwell et al. | |
| 5,317,705 A | 5/1994 | Gannon et al. | 718/100 |
| 5,586,283 A | 12/1996 | Lopez-Aguado et al. | 711/207 |
| 5,617,553 A | 4/1997 | Minagawa et al. | |
| 5,699,543 A | 12/1997 | Saxena | 711/203 |
| 5,787,494 A | 7/1998 | DeLano et al. | 711/206 |
| 6,038,639 A * | 3/2000 | O'Brien et al. | 711/114 |
| 6,075,938 A | 6/2000 | Bugnion et al. | 703/27 |
| 6,182,195 B1 | 1/2001 | Laudon et al. | 711/141 |
| 6,308,231 B1 | 10/2001 | Galecki et al. | |

(Continued)

FOREIGN PATENT DOCUMENTS

| | | |
|---|---|---|
| GB | 2376761 | 12/2002 |
| WO | WO 03/090070 | 10/2003 |

OTHER PUBLICATIONS

Eranian, S. et al., "Virtual Memory in the IA-64 Linux Kernel," *Prentice Hall PTR*, www.phptr.com/articles/article.asp?p+29961 &seqNum+4&rl+1, 2002, downloaded Aug. 31, 2006, 12 pages.

(Continued)

*Primary Examiner* — Reginald Bragdon
*Assistant Examiner* — Mehdi Namazi
(74) *Attorney, Agent, or Firm* — Tony Azure; Andrew Sanders; Micky Minhas (57) ABSTRACT

Various operations are disclosed for improving the operational efficiency of a virtual translation look-aside buffer (TLB) in a virtual machine environment. For example, operations are disclosed that allow for determination of whether present entries in shadow page tables (SPTs) are stale by comparing shadowed guest page table (GPT) entries against snapshots taken when the entries were cached. Other operations are disclosed that allow a virtual machine monitor (VMM) to access shadow page table trees (SPTTs) by walking trees in software or in hardware. Still other operations are disclosed allowing the VMM to use a hash table to relate GVA ranges to SPTs that map them, thus significantly reducing the cost of having to walk each SPTT in order to invalidate desired GVA(s). And, finally, operations are disclosed allowing the VMM to determine global GVA ranges by checking a bitmap, when invalidating global GVAs.

19 Claims, 10 Drawing Sheets

(56) References Cited

U.S. PATENT DOCUMENTS

| | | | |
|---|---|---|---|
| 6,442,666 B1 | 8/2002 | Stracovsky | 711/206 |
| 6,453,387 B1 | 9/2002 | Lozano | |
| 6,496,847 B1 | 12/2002 | Bugnion et al. | |
| 6,681,311 B2 | 1/2004 | Gaskins et al. | |
| 6,721,839 B1 | 4/2004 | Bauman et al. | 710/305 |
| 6,785,886 B1 | 8/2004 | Lim et al. | 718/1 |
| 6,907,600 B2 | 6/2005 | Neiger et al. | 717/139 |
| 7,069,389 B2 | 6/2006 | Cohen | 711/135 |
| 7,069,413 B1 | 6/2006 | Agesen et al. | 711/207 |
| 7,111,145 B1 | 9/2006 | Chen et al. | 711/206 |
| 7,111,146 B1 | 9/2006 | Anvin | |
| 7,149,832 B2 | 12/2006 | Wieland et al. | |
| 7,191,440 B2 | 3/2007 | Cota-Robles et al. | |
| 7,209,994 B1 | 4/2007 | Klaiber et al. | |
| 7,222,221 B1 | 5/2007 | Agesen et al. | |
| 7,225,441 B2 | 5/2007 | Kozuch et al. | |
| 7,334,142 B2 | 2/2008 | Hack | |
| 7,356,665 B2 | 4/2008 | Rawson | |
| 7,434,003 B2 | 10/2008 | Oney et al. | |
| 7,512,769 B1 | 3/2009 | Lowell et al. | |
| 7,552,426 B2 | 6/2009 | Traut | |
| 2002/0082824 A1 | 6/2002 | Neiger et al. | 704/2 |
| 2002/0169938 A1 | 11/2002 | Scott et al. | 711/207 |
| 2003/0172305 A1 | 9/2003 | Miwa | |
| 2005/0044301 A1 | 2/2005 | Vasilevsky et al. | 711/1 |
| 2005/0044339 A1 | 2/2005 | Sheets | 711/206 |
| 2005/0080934 A1 | 4/2005 | Cota-Robles et al. | |
| 2005/0172099 A1 | 8/2005 | Lowe | 711/207 |
| 2006/0005190 A1 | 1/2006 | Vega et al. | |
| 2006/0026383 A1 | 2/2006 | Dinechin et al. | 711/207 |
| 2006/0064567 A1 | 3/2006 | Jacobson et al. | 711/207 |
| 2006/0112212 A1 | 5/2006 | Hildner | 711/6 |
| 2006/0174053 A1 | 8/2006 | Anderson et al. | 711/6 |
| 2006/0259732 A1* | 11/2006 | Traut et al. | 711/173 |
| 2006/0259734 A1* | 11/2006 | Sheu et al. | 711/203 |
| 2007/0011444 A1 | 1/2007 | Grobman et al. | |
| 2007/0112999 A1 | 5/2007 | Oney et al. | |
| 2008/0215848 A1 | 9/2008 | Sheu et al. | |

OTHER PUBLICATIONS

Uhlig, V. et al., "Towards Scalable Multiprocessor Virtual Machines," *Proceedings of the 3rd Virtual Machine Research & Technology Symposium*, San Jose, CA, http://l4ka.org/publications/2004/Towards-Scalable-Mutliprocessor-Virtual-Machines-VM04.pdf, May 6-7, 2004, 1-14.

Chang, MS et al., "Lazy TLB Consistency for Large-Scale Multiprocessors," *IEEE*, http://ieeexplore.ieee.org/iel3/4457/12637/00581683.pdf?tp=&arnumber=581683&isnumber=12637&htry=2, Mar. 17-21, 1997, 308-315.

King, S. et al., "Operating System Support for Virtual Machines," *Proceedings of the 2003 USENIX Technical Conference*, http://www.eees.umich.edu/virtualpapers/king03.pdf, Jun. 9-14, 2003, 14 pages.

LeVasseur, J. et al., "Pre-Virtualization: Slashing the Cost of Virtualization," *Nat'l ICT Australia*, Oct. 2005, 1-14.

Rosenburg, B.S., "Low-Synchronization Translation Lookaside Buffer Consistency in Large-Scale Shared-Memory Multiprocessors," *ACM*, http://www.logos.t.u-tokyo.ac.jp/~tau/os-lecture/articles/p137-rosenburg.pdf#search=%22Translation-lookaside%20buffer%20consistency%22, Dec. 1989, 137-146.

Taylor, G. et al., "The TLB Slice—a Low-Cost High-Speed Address Translation Mechanism," IEEE, http://delivery.acm.org/10.1145/330000/325161/p355-taylor/pdf?key1=325161&key2=8514904611&coll=Guide&dl=Guide&CFID=4997640&Cftoken=80512607, Jun. 1990, 355-363.

VMware, Inc., "vmi_spec: Paravirtualization API Version 2.0," www.vmware.com/pdf/vmi_cpecs.pdf, Mar. 2006, 1-35.

Barham et al., "Xen and the art of virtualization," ACM Press, *Proceedings of the Nineteenth ACM Symposium on Operating Systems Principles*, Oct. 19-22, 2003, 164-177.

* cited by examiner

REDUCTION OF OPERATIONAL COSTS OF VIRTUAL TLBS

FIELD OF TECHNOLOGY

The presently disclosed subject matter relates to the field of computing, and more particularly, to computer virtualization, although virtualization is merely an exemplary and non-limiting field.

BACKGROUND

A virtual machine monitor (VMM), such as a hypervisor, is a program that creates virtual machines, each with virtualized hardware resources which may be backed by underlying physical hardware resources. To virtualize memory, the VMM can implement virtual translation look-aside buffers (TLBs) that cache address translations from page tables specified by guest operating systems, much like TLBs associated with physical processors. However, some operations associated with such virtual TLBs may be costly, since virtualization may entail several layers of translations between virtual memories (such as guest and hypervisor virtual memories) and physical memories (such as guest and system physical memories). Thus, it would be advantageous to provide mechanisms that would reduce the operational costs associated with virtual TLBs.

SUMMARY

In order to reduce operational costs associated with virtual TLBs, various mechanisms are provided herein that use and leverage information in virtualization environments. For example, in one aspect of the presently disclosed subject matter, present entries in shadow page tables (SPTs) can be rapidly checked for staleness by having a short list of such entries along with a snapshot of shadowed guest page table (GPT) entries. A comparison of the snapshot against the corresponding GPT entries can be performed to determine which entries in the SPTs are stale.

In another aspect, a virtual machine monitor (VMM) can access shadow page table trees (SPTTs) by walking trees in software in order to obviate limitations in certain processor architectures. And, in another related aspect, the VMM can access SPTTs using the hardware memory management unit (MMU), thus being able to walk SPTTs using hardware instead of software (as was done in the previous aspect). In yet another aspect, the VMM services invalidations of guest virtual addresses (GVAs) by using a hash table that relates GVA ranges to SPTs that map them, thus significantly reducing the cost of having to walk each SPTT in order to invalidate desired GVA(s). And, in a related aspect, the VMM can determine whether a GVA range is global by checking a bitmap for global GVA ranges, when invalidating global GVAs.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

The various aspects of the presently disclosed subject matter are divided into the following sections: (1) virtual machines in general terms; (2) virtual machine translations and caches; and (3) improvement of operation efficiency of virtual TLBs. All of these sections, when read individually, are meant to be read in light of the remaining sections. The present disclosure is not limited to any one of these aforementioned sections.

Virtual Machines in General Terms

Figure 1:
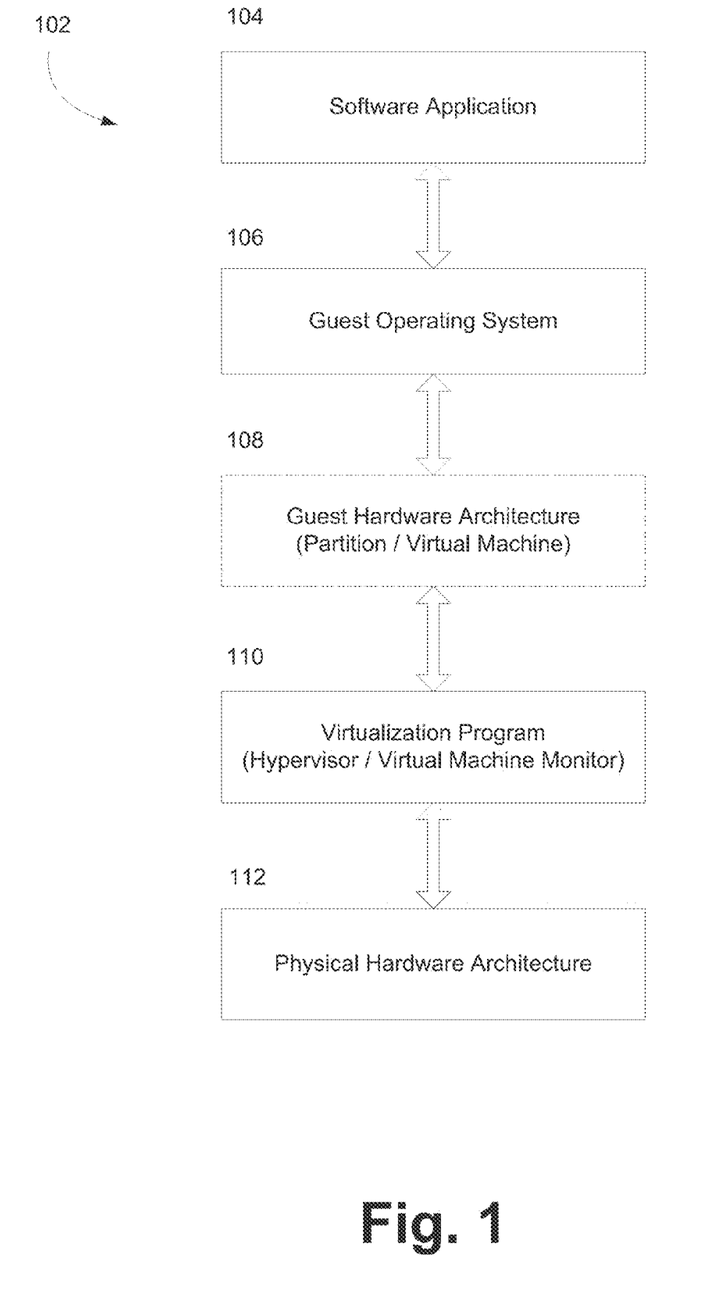
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system, (b) a host operating system with a hypervisor component, where the hypervisor component performs the virtualization, (c) hardware, or (d) micro-code. The virtualization program 110 virtualizes a guest hardware architecture 108 (shown as dashed lines to illustrate the fact that this component is a "partition" or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
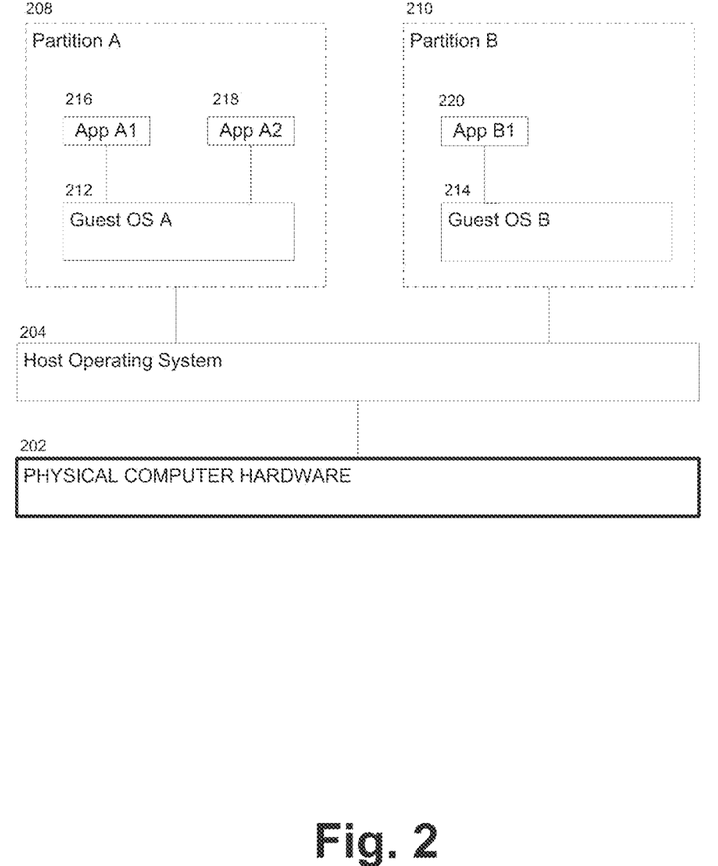
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that may exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
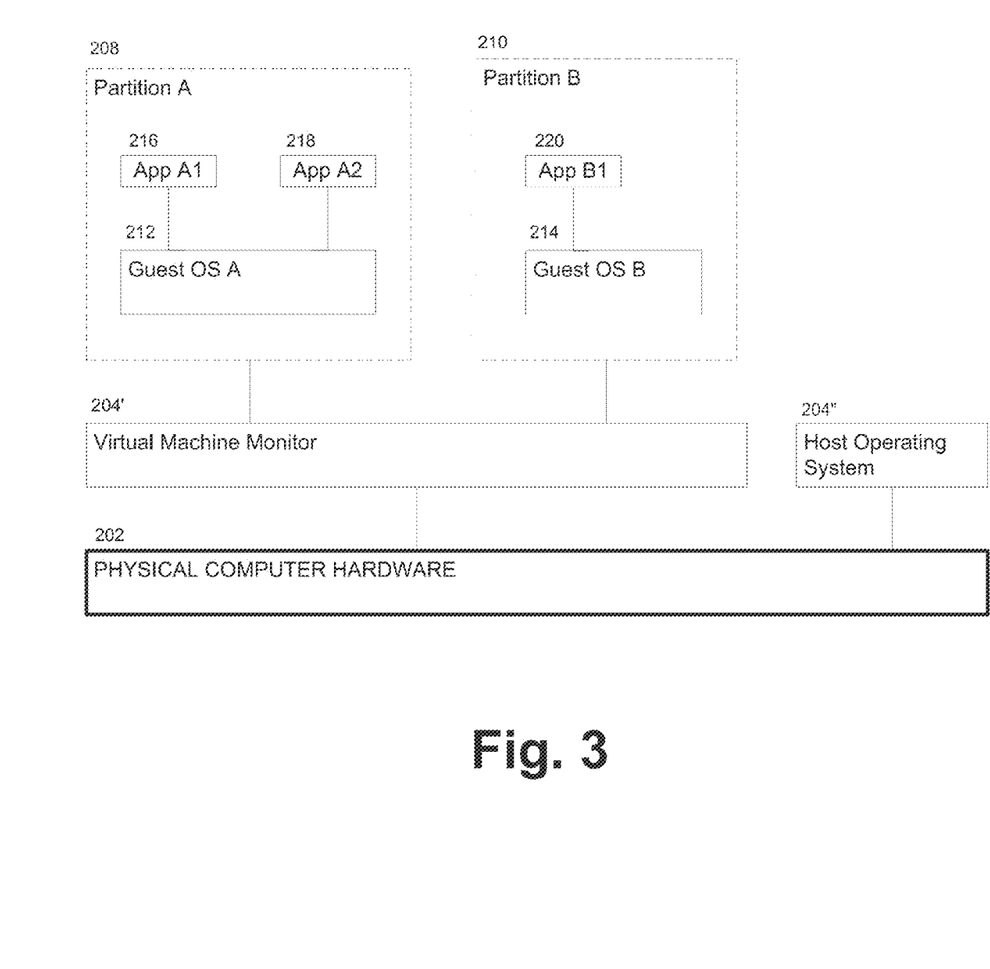
FIG. 3 is a block diagram representing an alternative virtualized computing system, where virtualization is performed by a virtual machine monitor (VMM) running alongside a host operating system.

FIG. 3 illustrates an alternative virtualized computing system where the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 3, the VMM 204' may instead comprise a partially independent software system that on some levels interacts indirectly with the computer hardware 202 via the host operating system 204", but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Virtual Machine Translations and Caches

As was mentioned above, a virtual machine monitor (VMM), such as a hypervisor, is a program that creates virtual machines, each with virtualized hardware resources which may be backed by underlying physical hardware resources. The operating system that runs within a virtual machine can be referred to as a guest. Each page of guest memory may be backed by a page of physical memory, but the physical address exposed to the guest is typically not the same as the actual physical address on the physical machine. In addition, the guest typically cannot access physical memory that has not been allocated to the virtual machine.

Many processor architectures can enforce a translation from virtual addresses (VA) to physical addresses (PA), specified by the operating system using data structures such as page tables. An address space can comprise of a tree of page tables, which may correspond to a sparse map from VAs to PAs. Programs running on the operating system access memory via virtual addresses, which enables operating systems to virtualize their memory and control their access to memory. The VMM can make an additional translation from guest physical addresses (GPA) to system physical addresses (SPA) to virtualize guest memory.

The guest operating system maintains guest page tables (GPT) that specifies GVA-to-GPA translations. The VMM enforces GPA-to-SPA translations and maintains shadow page tables (SPTs) that specify GVA-to-SPA translations, caching GVA-to-GPA translations from the guest page tables. The VMM points the physical processor to the SPTs so the guest software gets the correct system physical page when accessing a GVA.

Many processor architectures have a translation lookaside buffer (TLB) to cache VA-to-PA translations to avoid having to walk the page tables on every memory access, which is expensive. When the accessed VA is not cached in the TLB, which is known as a TLB miss, the processor's memory management unit (MMU) must walk the page tables starting from the base of the page table tree specified by the operating system, or the VMM in this case. The MMU can then add the VA-to-PA translation to the TLB, known as a TLB fill.

Some processor architectures define the TLB as a non-coherent cache of the page tables. The operating system or the VMM is responsible for notifying the processor of changes to the translations in its page tables to ensure the TLB does not have inconsistent or stale translations. Those processor architectures provide instructions to invalidate cached translations at a few granularities, such as invalidating a single translation and invalidating all translations. Architectures such as x86 and x86-64 invalidate all (non-global) cached translations when the register that points to the base of the page table tree is modified to switch between address spaces. The shadow page tables cache GVA-to-GPA translations in the guest page tables, effectively acting as a virtual TLB.

Figure 4:
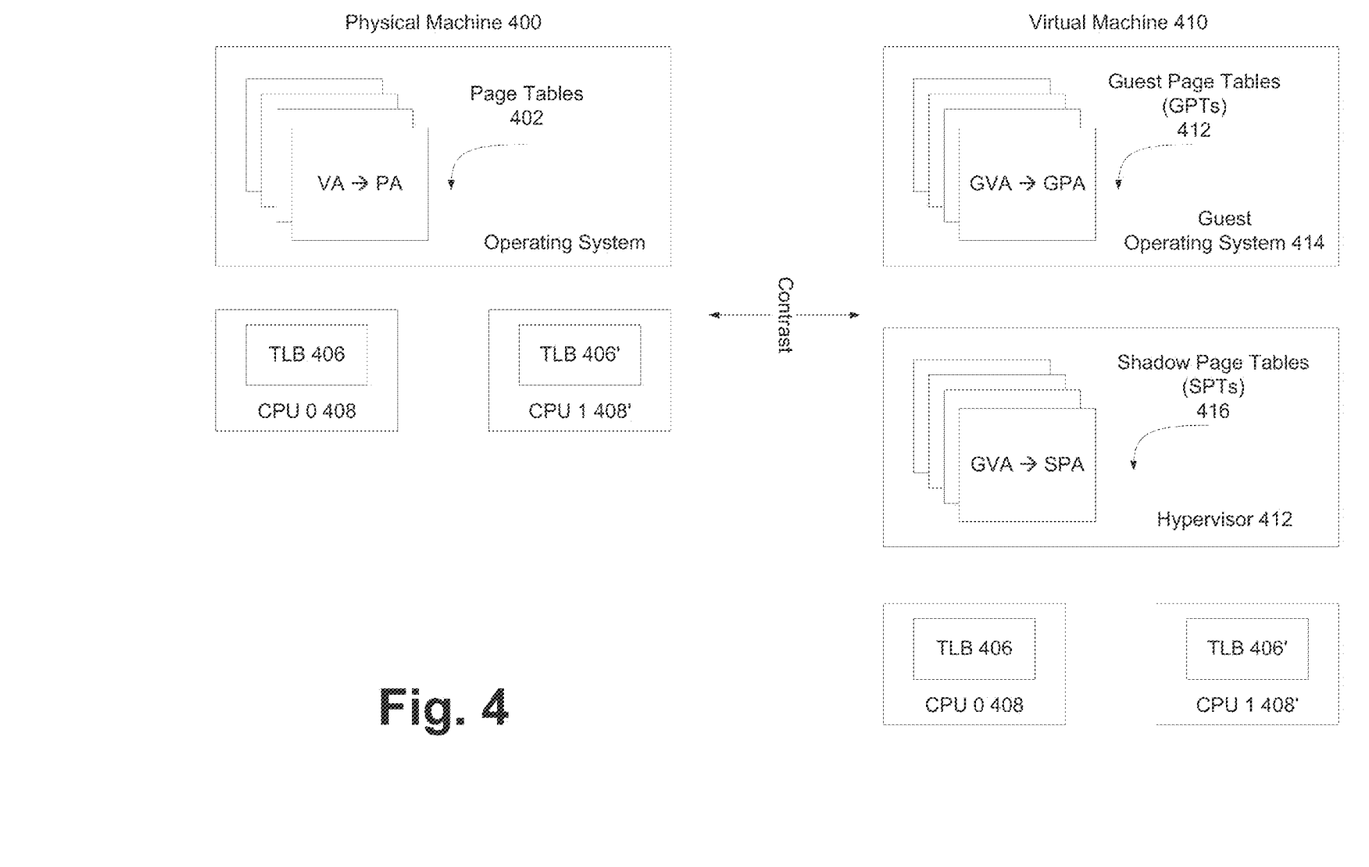
FIG. 4 illustrates the contrast between a physical machine architecture and a virtual machine architecture in order to further explain how terms, such as virtual addresses (VAs), physical addresses (PAs), guest virtual addresses (GVAs), guest physical addresses (GPAs), system physical addresses (SPAs), guest page tables (GPTs), shadow page tables (SPTs), and so on, relate to one another.

FIG. 4 illustrates the contrast between a physical machine 400 architecture and a virtual machine architecture 410, in order to further explain how all the terms discussed above and below, namely, how VAs, PAs, GVAs, GPAs, SPAs, GPTs, SPTs relate to one another. Specifically, a physical machine 400 may have its own associated pages tables 402 that contain VA-to-PA translations. Moreover, these VA-to-PA translations may be cached in TLBs on a per-processor basis: TLB 406 is associated with CPU 0 (central processing unit 0) 408, while TLB 406' is associated with CPU 1 408'.

In contrast to this physical machine 400 architecture, a virtual machine 410 architecture that is build on top of the physical machine 400, has more complex layers of page tables, namely, there are GPTs and SPTs. Per FIG. 4, GPTs 412 contain GVA-to-GPA translations associated with some guest operating system 414. Additionally, a VMM, such as a hypervisor 412, maintains SPTs that act as kind of virtual TLBs (vis-à-vis TLBs 406 and 406'). The virtual machine 410 architecture, just as the physical machine 400 architecture, also uses physical TLBs: TLB 406 and TLB 406', corresponding to CPU 0 408 and CPU 1 408', respectively.

The VMM builds up a cache of translations in the virtual TLB on demand as the guest accesses memory. The virtual TLB initially may not cache any translations. When the guest accesses a GVA for the first time, the processor generates a page fault exception and notifies the VMM of the virtual TLB miss, since there was no translation for that GVA in the SPT tree. The miss handler performs a virtual TLB fill at that GVA by walking the GPT tree to that GVA, reading the GVA-to-GPA translation, translating the GPA to an SPA, and filling the SPT entry with the newly cached GVA-to-SPA translation.

Figure 5:
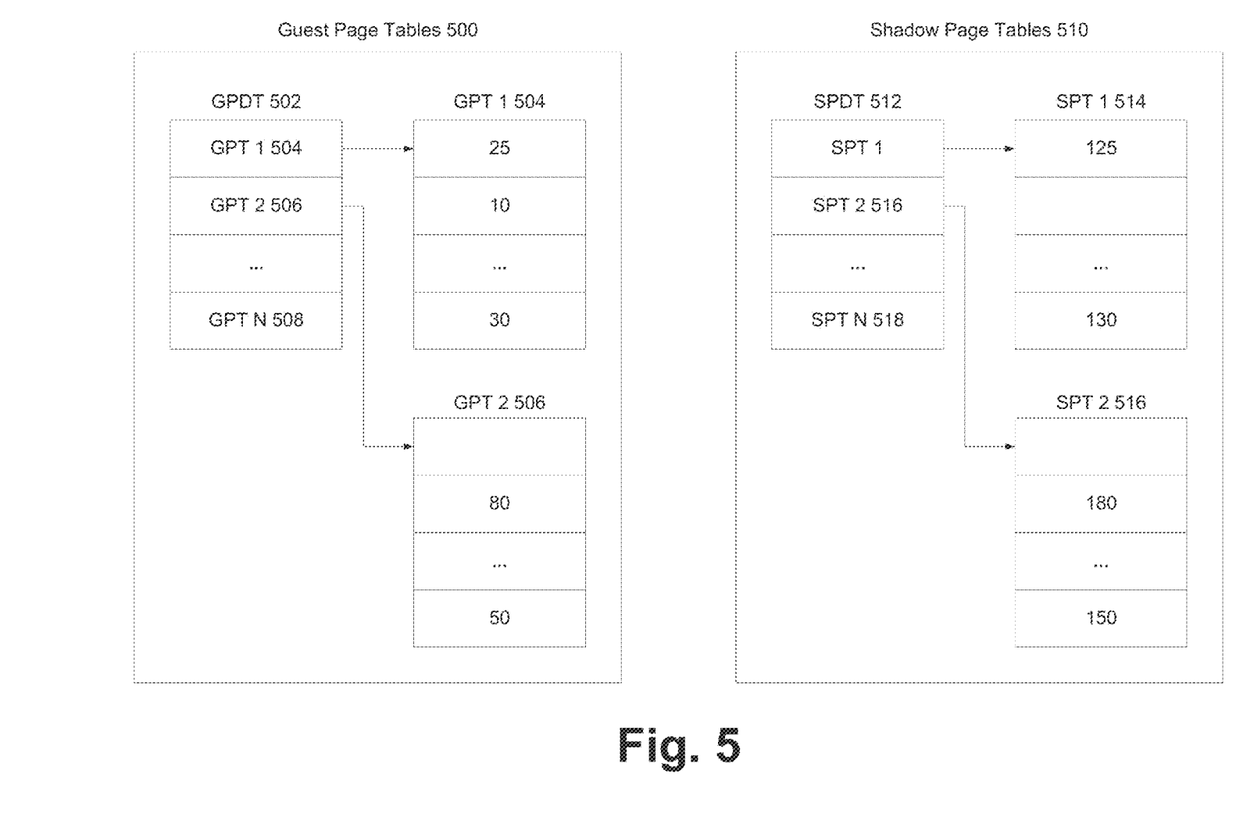
FIG. 5 illustrates the notion of performing a fill in a virtual TLB (comprised of shadow page tables) upon a miss.

FIG. 5 illustrates the notion of performing a fill in a virtual TLB upon a miss. A collection of guest page tables 500 are shown. A guest page directory (GPDT) 502 maintains a listing of all its corresponding guest page tables: GPT 1 504, GPT 2 506, and so on, until the last GPT N 508 (not shown)—page tables that are leaves in a tree such as GPT 1 504 and GPT 2 506 can be referred to as leaf or terminal page tables. The first guest page table, GPT 1 504, may have various entries, for example, guest physical addresses (25, 10, 30, and so on, which may have corresponding GVA entries—not shown). Similarly, the second guest page table, GPT 2 506, may have various guest physical address entries, such as 80, 50, and so on. A fill in a virtual TLB (upon a miss), may start out by having a miss handler walk the GPDT 502, identify the correct GPT, and then read the identified GPT entries.

For example, the miss handler could read entry "50" in GPT 2 506 and translate this guest physical address to a system physical address, say, "150". This latter value then, is filled in the corresponding shadow page table (e.g., SPT 2 514, SPT 2 516) (acting as a virtual TLB), namely, SPT 2 516. Specifically, the entry "150" is placed in the appropriate slot of the SPT 2 516, which corresponds to the entry "50" in a slot of the GPT 2 506. Other values are similarly synchronized between guest page tables 500 and shadow page tables 510.

On the other hand, if a guest invalidates GVAs, the VMM must remove the GVA-to-SPA translations from the SPTs and the underlying hardware TLBs. It is expensive to flush virtual TLBs whenever the guest switches between address spaces. Thus, as will be shown next, in other aspects of the presently disclosed subject matter, performance and scalability of guest memory virtualization algorithms can be improved on by building upon other related and commonly assigned subject matter disclosed in U.S. patent application Ser. No. 11/128,982, entitled "Method and system for caching address translations from multiple address spaces in virtual machines" (disclosing algorithms implementing tagged TLBs in software, which cache and retain translations from multiple address spaces at a time, maintaining multiple shadow address spaces, each of which is a tree of shadow page tables, and caching translations from a guest address space), and U.S. patent application Ser. No. 11/274,907, entitled "Efficient operating system operation on a hypervisor" (describing how the VMM can expose a set of APIs known as hypercalls, some of which perform virtual TLB operations; those operations enable an enlightened guest to provide hints and use less expensive virtual TLB operations).

Improvement of Operational Cost of Virtual TLBs

Figure 6:
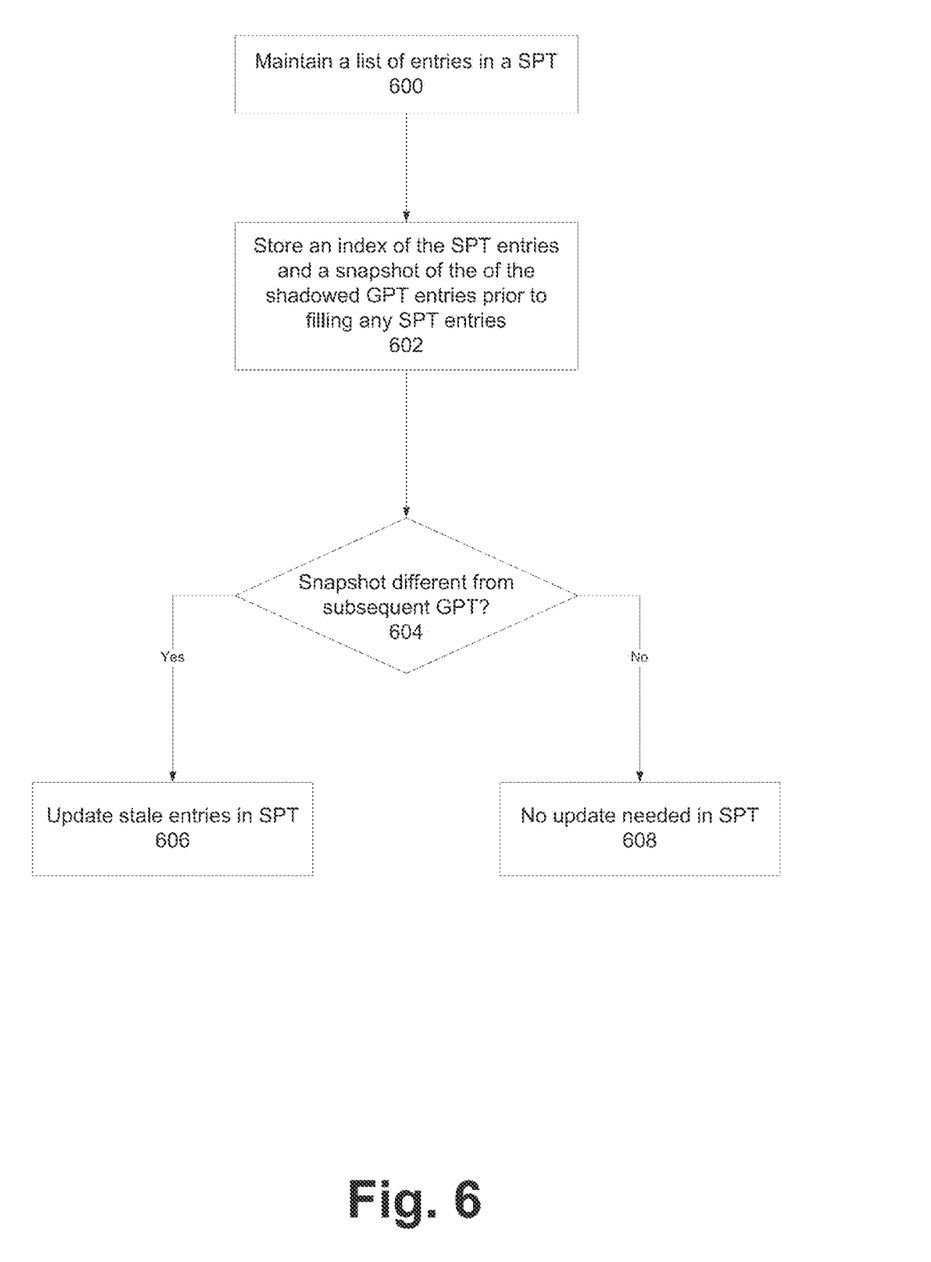
FIG. 6 illustrates that present entries in tables can be rapidly checked by having a short list of such entries in each SPT, along with a snapshot of the shadowed GPT entries, in order to see, via a comparison of the list to the snapshot, which entries in the SPTs have been modified.

In one aspect of the presently disclosed subject matter, in FIG. 6, the VMM maintains an indexed short list of the present entries in each shadow page table (SPT), along with a snapshot of the corresponding shadowed guest page table (GPT) entries. This enables the VMM to rapidly enumerate the present SPT entries and change them, if necessary, if it is determined that there is a disparity between a snapshot of a GPT and a state of a GPT at a later time.

The VMM may validate shadow page tables frequently to eliminate the stale entries or zero shadow page tables before freeing or allocating them. A page table in some processor architectures may have 512 entries or more, so the VMM needs a way to rapidly locate the present entries to avoid having to scan the entire page table. Also, to validate a present SPT entry, the VMM can read the shadowed GPT entry, translate the GPA to an SPA, and compare the SPA with that of the SPT entry. However, the translation from GPA to SPA may not be efficient.

Thus, this aspect maintains a short list of the present entries in each shadow page table, along with a snapshot of the shadowed GPT entries in order to reduce the operational cost of maintaining a virtual TLB. The VMM enumerates the present SPT entries and checks the shadowed GPT entries to determine if they have been modified. Moreover, if the list overflows, the VMM assumes every entry in the shadow page table may be present.

In other words, an optimization is introduced in the present aspect, and it has two parts. First, a snapshot of a GPT is taken. This snapshot can be compared to a later state of the GPT in order to determine if any changes in the GPT have been made. Moreover, this snapshot enables the VMM to determine whether a GPT entry has changed since its value was cached in the corresponding SPT entry. Second, the list of SPT entries enables the VMM to rapidly enumerate the present entries. In filling an SPT entry, the VMM can add its index to the list and store the snapshot of the corresponding GPT. The snapshot can be stored with the entry index as part of the list in one embodiment, but it does not have to be stored in this manner. In validating a SPT, the VMM enumerates the present entries in the SPT using the list, and checks the corresponding GPT entry against its snapshot. If the snapshot differs from the current GPT entry, the SPT entry is stale and it is changed with the help of the aforementioned index.

Turning now to FIG. 6, at block 600, a list of entries in a SPT is maintained. As was already mentioned above, this list may be indexed so that entries are enumerated and such entries can be quickly replaced (without doing translations) if they are stale. Thus, at block 602, an index of the SPT entries is stored, and a snapshot of the GPT entries is taken. At block 604, a determination is made whether the stored snapshot is different from subsequent GPT entries. If so, at block 606, SPT entries that correspond to the GPT entries that differ from their snapshots are updated; if not, then they are not updated 608.

In another aspect of the presently disclosed subject matter, in FIG. 7, the VMM can access shadow page table trees (SPTTs) by walking trees in software (as opposed to the another aspect of the present disclosure, below in FIG. 8, which performs such walking in hardware). In a typical SPPT, non-terminal shadow page table (SPT) entries can specify the system physical address (SPA) of the next-level SPT, but some processor architectures, such as x86, permit software to access memory only via a virtual address, so the VMM may not directly read from the next-level SPT using the SPA. In such cases, to walk a SPT tree in software, the VMM can convert the SPA into a reference to an SPT, which in one embodiment, may be a hypervisor virtual address (HVA) that maps to the SPA.

In this aspect, the VMM may maintain a physical page frame number (PPFN) database, which records information on every page of physical memory. Fields in this database may be used to relate an SPA to the SPT at that SPA. This relation would be established when the SPT is allocated and before it is used. The VMM can then consult the PPFN database to walk from one level of an SPT tree to the next using HVAs.

Figure 7:
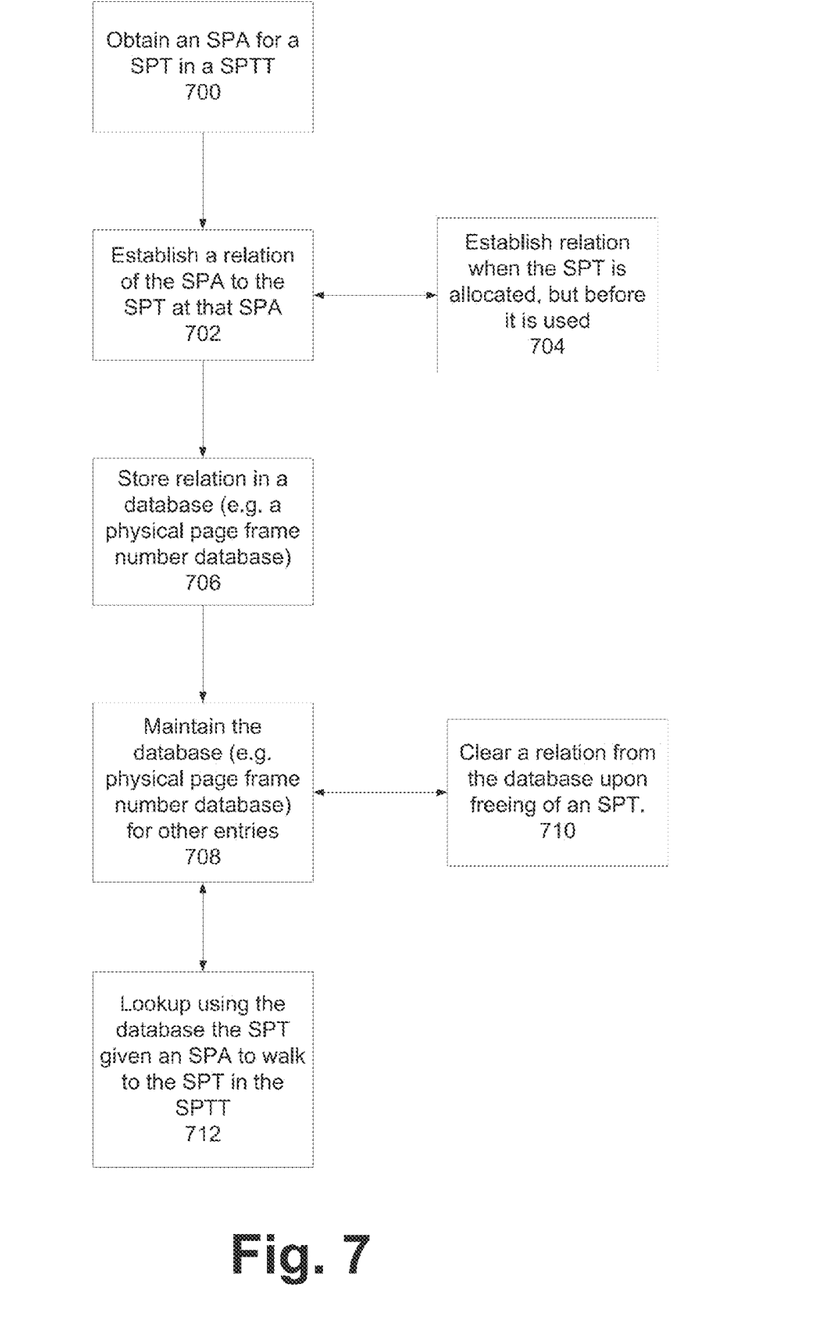
FIG. 7 illustrates that the VMM can access shadow page table trees (SPTTs) by walking trees in software using a database that relates SPAs to the SPTs at the SPAs.

FIG. 7 shows how a VMM using PPFN database information can walk from one level of SPTT to the next. Specifically, at block 700, an SPA is obtained for a SPT in a SPTT. At block 702, once this SPA is obtained, it can be related to the SPT at that SPA. Moreover, at block 704, the relation between the SPT and the SPA can be established at the time the SPT is allocated and before the SPT is used.

Next, at block 706, this relation can be stored in any kind of database, such as a PPFN database that describes the state of each page in physical memory. Then, at block 708, this and any other relations of SPAs-to-SPTs can also be stored for any number of SPTs in the SPTT (or other SPTs in other SPTTs). Moreover, at block 710, any SPTs that have been freed from memory can have their SPAs-to-SPTs relations cleared from the database. At block 712, if the VMM (or some other module in a virtual environment) wants to walk to a particular SPT given an SPA, the VMM can lookup the HVA reference to that SPT using the PPFN database.

Figure 8:
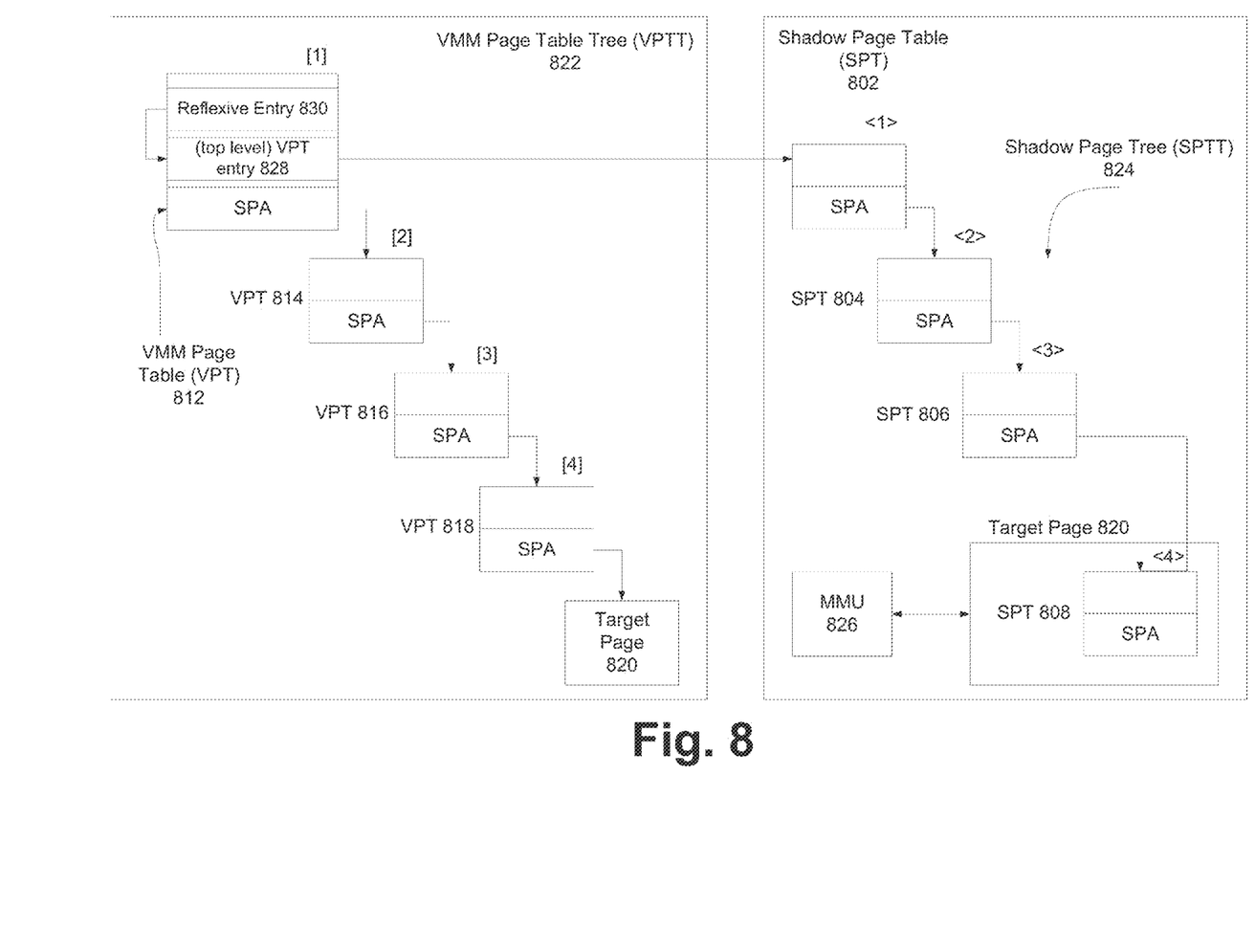
FIG. 8 illustrates that the VMM can access SPTTs using the hardware memory management unit (MMU)

In another aspect of the presently disclosed subject matter, in contrast to FIG. 7, FIG. 8 illustrates how a VMM can access shadow page table trees (SPTTs) using the hardware memory management unit (MMU). As was mentioned above, non-terminal shadow page table (SPT) entries can specify the system physical address (SPA) of the next-level SPT, but some processor architectures, such as x86, permit software to access memory only via a virtual address, so that the VMM may not directly read from the next-level SPT using the SPA. However, the hardware MMU in the physical processor is able to directly access memory via an SPA. The VMM can use the hardware MMU to walk an SPTT, which would eliminate costs of consulting the aforementioned PPFN database, depicted in FIG. 7, at each step of the page table walk. Thus, this aspect, in FIG. 8, can be viewed as an improvement on the improvement discussed with reference to FIG. 7.

Turning now to FIG. 8, a VMM address space can be defined by a tree of VMM page tables (VPTT) 822 that translate from hypervisor virtual addresses (HVAs) to SPAs. In most architectures, the VMM only access a page of memory via an HVA. The purpose of this aspect is to make each SPT in the SPTT be a target page in the VPTT. By pointing one top-level VPT entry to the SPTT and another entry to the top-level VPT itself, the VMM has ensured that there is an HVA for every SPT in the SPTT. The VMM performs a simple computation to obtain the HVA of an SPT in that VPTT (based on the index of the entries the MMU must follow).

For example, processors can use the active VMM address space to translate HVAs accessed by the VMM. The VMM can use the hardware MMU 826 to walk an SPT tree, for example, SPT 808, by appending the SPTT 824 to the VPTT 822. Specifically, an entry (a so called "shadow entry" or "virtual page table" ("VPT") entry 828) in the top-level VMM page table 812 points (e.g. via a pointer) to the top-level SPT 802 in SPTT 824.

For instance, if the lowest level in a page table tree is 1, then an SPT at level N in the SPTT would be at level N+1 in the VPTT. FIG. 8 provides a concrete example: SPT 802 is at level <1> in the SPTT 824 (it should be noted that SPT 802 is labeled with <1>, SPT 804 with <2>, SPT 806 with <3>, and SPT 808 with <4>, in order to indicate their level within the SPTT). Moreover, the lowest-level SPT, namely SPT 808, would be treated as a data page (i.e. a target page 820) by the MMU when it walks the VPTT 822, so there is now an HVA that maps the lowest-level SPT 808.

In addition, the top-level VPT 812 can have an entry that points to itself, known as a "reflexive entry" 830. This configuration enables the VMM to access a higher-level SPT, namely, SPT 806, SPT 804, and SPT 802, via an HVA that walks one or more times through the reflexive entry, before walking down through the SPTT 824. The MMU walks the SPTT, which may be faster than the software method described with reference to FIG. 7. It should be noted that this may require the VMM to invalidate the hardware TLB when it makes changes to the SPTT 824, but this technique may be faster overall than other alternatives.

The following provides a concrete but non-limiting example of this aspect. A VMM may have a tree 822 of VPTs 812, 814, 816, 818, wherein the top-most VPT 812 is at level "[1]", the next VPT 814 is at level "[2]", VPT 814 is at level "[3]", and VPT 818 is at level "[4]". And, this last VPT 818 may point to some page, called a "target page" 820. One goal of this aspect is to designate a SPT (in this case, SPT 808) as the "target page" 820, so that an MMU 826 can access it (so that eventually the VMM can access the SPT via an HVA based on the VMM's own HVA-to-SPA translations).

Figure 9:
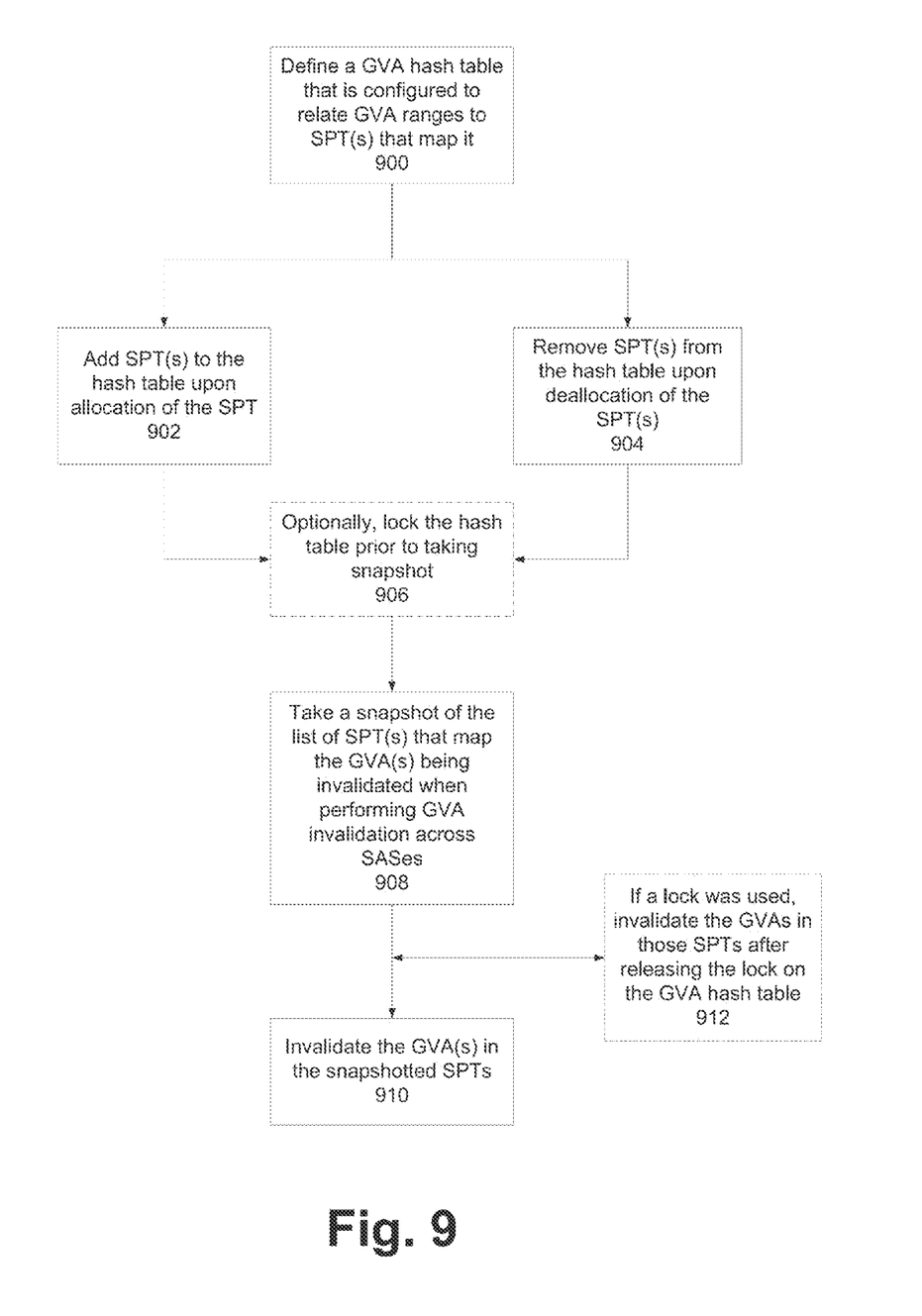
FIG. 9 shows how the VMM services invalidations of GVAs by using a hash table that relates GVA ranges to SPTs that map them.

In another aspect of the presently disclosed subject matter, FIG. 9 illustrates shows how the VMM services invalidations of guest virtual addresses (GVAs) by using a hash table that relates GVA ranges to SPTs that map them. For example, in order to service an invalidation request of a global GVA, the VMM has to remove the GVA-to-SPA translations from every shadow address space (SAS). The virtual TLB may contain many SASes, and it would be expensive to walk each SPT tree (SPTT) to invalidate the appropriate GVA. Instead, the VMM can maintain a hash table that enables the rapid discovery of every SPT that maps the invalidated GVA. Each SPT maps (i.e., defines) a specific GVA range, the size of which is dependent on the level of the SPT in the SPTT. The hash table relates each GVA range to the set of SPTs that map the entire VA range.

The hash table may be synchronized by a lock on each hash bucket (i.e. a set of SPTs which correspond to an invalidation range). An SPT is inserted into the hash table upon allocation and removed upon deallocation. In performing a global GVA invalidation, the VMM may acquire the lock on the hash bucket for the affected GVA range, snapshot the list of SPTs that map the VA range, and release the lock. The invalidation does not need to happen under the hash bucket lock, since a GVA invalidation handler drains any pending fills so any SPTs allocated and filled subsequently will not contain the invalidated GVA. This is important for reducing the hold time on the lock on the hash bucket.

In other words, per FIG. 9, this aspect enables the VMM to rapidly invalidate a GVA in all SASes, without the cost of walking every shadow page table tree in the virtual TLB. Specifically, at block 900, a GVA hash table is defined, wherein this hash table is configured to store relations between GVA ranges and SPTs that map those ranges. As was indicated above, there may be one or more SPTs that map into any given GVA range. Next, at blocks 902 and 904, SPT(s) can be either added or removed from the hash table, respectively. In the former case, at block 902, SPT(s) are added upon allocation of such SPT(s). In the latter case, at block 904, SPT(s) can be removed from the hash table upon deallocation of such SPT(s).

In either case, once SPT(s) are stored in the hash table, upon an invalidation operation of some GVA(s) (one GVA or a set of GVAs), optionally, at block 906, the hash table may be locked by the VMM prior to taking the snapshot. Whether such a lock is performed or not, next at block 908, a snapshot of the list or set of SPT(s) that map to the about-to-be invalidated GVA(s) is taken. If, however, a lock was performed, before any GVA(s) are actually invalidated, the lock is released, as is shown at block 912. Finally, at block 910, the GVA(s) in the snapshotted SPT(s) are invalidated, thus obviating the need to walk the shadow page table trees of all SASes.

In yet another aspect of the presently disclosed subject matter, the VMM can determine whether a GVA is global by checking a bitmap for global GVA ranges. Some processor architectures, such as x86, have TLB invalidation instructions (e.g., INVLPG) that do not specify whether a GVA being invalidated is local or global. Hardware is able to infer this information since it records the scope of a virtual address translation in the TLB entry. The VMM is unable to rapidly infer this information from the SPT trees (SPTTs), since it must check the GVA in each tree. It could assume every invalidation request is for a global GVA, but that would flush translations unnecessarily, increase the virtual TLB miss rate, and increase the cost of non-global invalidations.

Some operating systems have only a few large contiguous ranges of the global GVAs. The VMM can infer whether an invalidation request is for a local or global GVA by tracking whether a GVA range has ever had a global translation using a small bitmap. A bit in the bitmap is set when the VMM caches a global GVA translation that lies in the corresponding GVA range. Thus, this aspect enables the VMM to avoid invalidating a GVA in all shadow address spaces if the request is for a local GVA.

Figure 10:
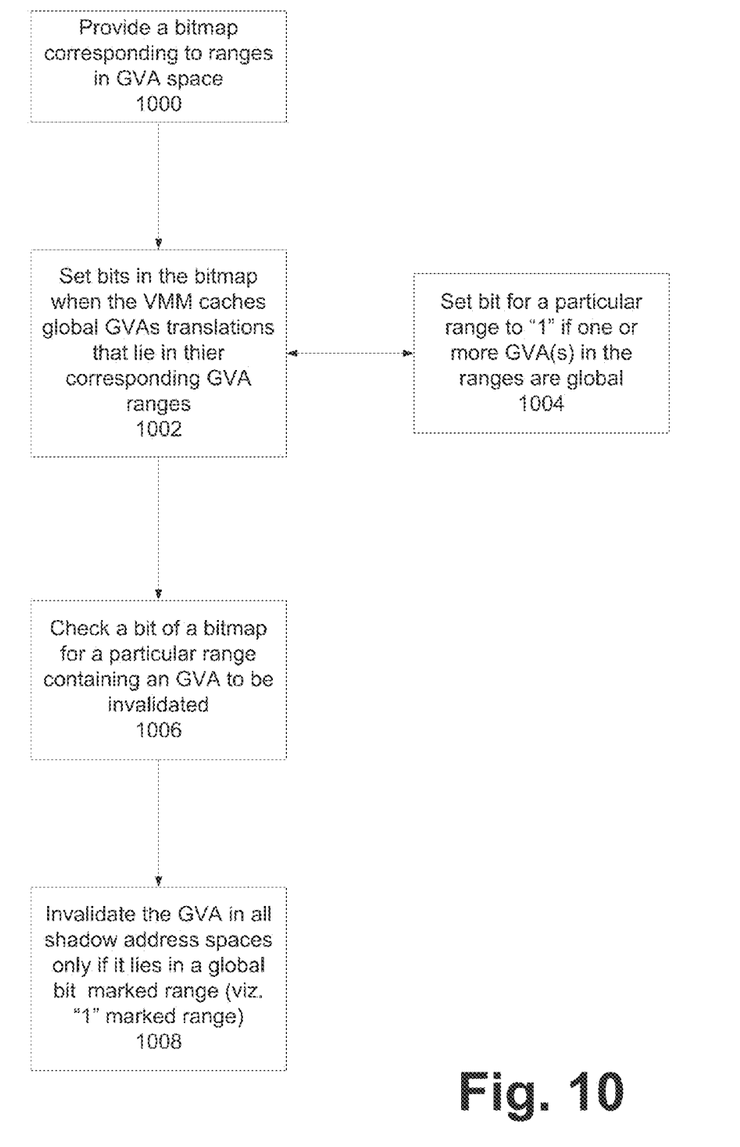
FIG. 10 shows how the VMM can determine whether a GVA is global by checking a bitmap for global GVA ranges.

FIG. 10 provides a block diagram of yet another aspect of the presently discussed subject matter, namely, showing that the VMM can determine whether a guest virtual address (GVA) is global by checking a bitmap for global guest virtual address ranges, and then proceed with a GVA invalidation. Thus, at block 1000, a bitmap is setup with initial values indicating no global GVAs, where the bitmap has bits corresponding to ranges in GVA space. The GVA space, for example, can be an address space reserved of an operating system. It can be divided into a plurality of ranges, and each of those ranges can be assigned a bit value.

At block 1002, bit values (such as "1s" or "0s") can be set at a time when the VMM caches global GVA translations in these ranges. For instance, at block 1004, a bit may be set for a particular range to "1" if there is one or more global GVA(s) in that range. One characteristic of global GVA(s) is that they have the same GVA-to-SPA mapping for all address spaces in a virtual TLB.

Once the bits in the bitmap are set at block 1002, then at block 1006 such bit values can be checked for a particular range containing a GVA(s) to be invalidated. In other words, if there is a GVA (or a plurality of GVAs) to be invalidated, such GVA(s) can be examined as to which range they fall into; then, the bit value for that range can be examined, to determine whether the range into which the GVA(s) fall is a global GVA range (e.g. bit value set to "1"), or a non-global GVA range (e.g. bit value set to "0"). Finally, at block 1008, the actual invalidation in all address spaces can occur only for those GVA(s) that fall within the global GVA ranges. For those GVA(s) that do not, the actual invalidation can be performed on only a single address space.

The methods, systems, apparatuses of the presently disclosed subject matter may also be embodied in the form of program code (such as computer readable instructions) that is transmitted over some transmission medium, such as over electrical wiring or cabling, through fiber optics, or via any other form of transmission, wherein, when the program code is received (and/or stored on computer readable media) and loaded into and executed by a machine, such as an EPROM, a gate array, a programmable logic device (PLD), a client computer, such as that shown in the figure below, a video recorder or the like, the machine becomes an apparatus for practicing the present subject matter. When implemented on a general-purpose processor, the program code combines with the processor to provide a unique apparatus that operates to perform the saving and restoring functionality of the present subject matter.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, mechanisms were disclosed for improving the operational efficiency of virtual TLBs. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for reducing an operational cost of a virtual machine environment, comprising:
   using at least one virtual translation look-aside buffer (TLB) with at least one shadow page table tree (SPTT), the SPTT capable of containing entries for at least two shadow page tables (SPT), and at least one SPT residing in the SPTT, wherein the at least one SPTT maps guest virtual addresses (GVAs) to system physical addresses (SPAs);
   caching translations from at least one guest page table (GPT), wherein the GPT map the GVAs to guest physical addresses (GPAs);
   using data from the at least one of SPT or the at least one GPT to perform an operation on the virtual TLB; and
   taking a snapshot of at least one entry in the GPT and maintaining a list of at least one entry in the at least one SPT, wherein the snapshot is compared to at least one entry in the at least one GPT at a different time, and if a disparity exists between the snapshot and the GPT entry at the different time, updating at least one entry in the SPT that corresponds to the snapshot that exhibits the disparity with help of the list, wherein the list also contains indices to entries in the at least one SPT.

2. The method according to claim 1, the operation further comprising:
   obtaining an SPA for a SPT;
   establishing a relation between the SPA and the SPT;
   storing the relation in a database;
   maintaining the database for the relation;
   looking up the SPA to walk to the SPT wherein the SPA is obtained from an entry in a higher-level SPT in the SPTT.

3. The method according to claim 2, wherein the establishing of the relation between the SPA and the SPT is established when the SPT is allocated and before the SPT is used.

4. The method according to claim 2, wherein the relation is cleared from a database before the SPT is freed.

5. The method according to claim 1, the operation further comprising:
   pointing a first entry in a top-level virtual machine monitor page table (VPT) at a top-level shadow page table (SPT) in the SPTT;
   pointing a second entry in the top-level VPT at the VPT itself;

accessing a target SPT at any level of a shadow page table tree (SPTT), wherein the accessing is made via a hypervisor virtual address (HVA) that walks through the second entry zero or more times and then follows the first entry in the top-level SPT.

6. The method according to claim 5, wherein a memory management unit (MMU) accesses the target SPT on behalf of a virtual machine monitor (VMM) given the HVA for the target SPT.

7. The method according to claim 1, the operation further comprising:
defining a hash table that is configured to relate GVA ranges to SPTs in the SPTT;
taking a snapshot of the at least one SPT that maps at least one GVA in a GVA range, wherein the at least one GVA has been selected for invalidation; and
invalidating the at least one GVA in the at least one SPT per the snapshot.

8. The method according to claim 7, further comprising after the defining, performing at least one of (a) adding at least one selected SPT to the hash table upon allocation of the at least one selected SPT, and (b) removing at least one selected SPT from the hash table upon deallocation of the at least one selected SPT.

9. The method according to claim 7, further comprising locking the at least one SPT before the snapshot and unlocking the at least one SPT after the snapshot.

10. The method according to claim 7, wherein the GVA is local to a shadow address space (SAS).

11. The method according to claim 7, wherein the GVA is global across a plurality of shadow address spaces (SASes).

12. The method according to claim 1, the operation further comprising:
providing a bitmap configured to have a set of bit values corresponding to a set of ranges in guest virtual address (GVA) space;
setting the set of bit values in the bitmap when caching GVA translations, wherein a range in the set of ranges is assigned a first bit value if at least one GVA translation in the range is a global GVA, and wherein the range is assigned a second bit value if no GVA translations in the range is the global GVA;
checking a bit value in the bitmap when an invalidation request is made for at least one GVA in a range corresponding to the bit value; and
invalidating the at least one GVA in all address spaces only if the bit value is the first bit value.

13. A system for reducing an operational cost of a virtual machine environment, comprising:
a computing device comprising a processor;
memory communicatively coupled to the computing device and storing program instructions that when executed by the processor, maintain:
at least one virtual translation look-aside buffer (TLB) with at least one shadow page table tree (SPTT), the SPTT capable of containing entries for at least two shadow page tables (SPT), and at least one SPT residing in the SPTT, wherein the at least one SPT maps guest virtual addresses (GVAs) to system physical addresses (SPAs); and
a set of guest page tables (GPTs), wherein the set of GPTs map the GVAs to guest physical addresses (GPAs); and
memory communicatively coupled to the computing device and storing data from the at least one of SPT and the set of GPTs to perform an operation on the virtual TLB.

14. The system according to claim 13, wherein the operation comprises of taking a snapshot a GPT of the set of GPTs, wherein the snapshot is compared to the GPT at a different time, and if a disparity exists between the snapshot and the GPT, updating a SPT associated with the GPT.

15. The system according to claim 13, wherein the operation comprises of accessing the SPTT by walking the SPTT in software.

16. The system according to claim 13, wherein the operation comprises of accessing the SPTT by walking the SPTT in hardware.

17. The system according to claim 13, wherein the operation comprises using a VMM to service GVA invalidations using a hash table relating the GVAs to the at least one SPT that maps the GVAs.

18. The system according to claim 13, wherein the operation comprises using a VMM to determine whether a GVA of the GVAs is global by checking a bitmap for global GVA ranges.

19. A physical computer readable apparatus bearing computer executable instructions for reducing an operational cost of a virtual machine environment, the instructions, when executed on a computer, causing the computer to perform operations comprising:
using a virtual translation look-aside buffer (TLB) with at least one shadow page table tree (SPTT), the SPTT containing entries for at least two shadow page tables (SPT), and at least one SPT residing in the SPTT, the at least one SPT mapping guest virtual addresses (GVAs) to system physical addresses (SPAs);
using a set of guest page tables (GPTs) to map the GVAs to guest physical addresses (GPAs); and
performing an operation on the virtual TLB using data from the at least one SPT and the set of GPTs.

* * * * *